US006555773B1

(12) United States Patent
Broghammer et al.

(10) Patent No.: US 6,555,773 B1
(45) Date of Patent: Apr. 29, 2003

(54) ELECTRIC SWITCH

(75) Inventors: Peter Broghammer, Wurmlingen (DE); Uwe Stratmann, Spaichingen (DE)

(73) Assignee: Marquardt GmbH, Rietheim-Weilheim (DE)

(*) Notice: Subject to any disclaimer, the term of this patent is extended or adjusted under 35 U.S.C. 154(b) by 0 days.

(21) Appl. No.: 09/647,658

(22) PCT Filed: Mar. 31, 1999

(86) PCT No.: PCT/DE99/00978

§ 371 (c)(1), (2), (4) Date: Oct. 4, 2000

(87) PCT Pub. No.: WO99/52118

PCT Pub. Date: Oct. 14, 1999

(30) Foreign Application Priority Data

Apr. 4, 1998 (DE) ........................................ 198 15 176

(51) Int. Cl.[7] ............................ H01H 9/06; H01H 9/20; H02K 7/14

(52) U.S. Cl. ................................ 200/61.85; 200/43.17; 200/50.01; 200/321; 200/334; 310/50

(58) Field of Search ........................... 200/43.08–43.22, 200/50.01–50.4, 318–327, 61.85, 329–334; 310/50

(56) References Cited

U.S. PATENT DOCUMENTS 3,847,233 A * 11/1974 Glover et al. ............... 173/170
4,296,290 A * 10/1981 Peot ........................... 200/325
4,665,290 A * 5/1987 Piber .......................... 200/303
4,763,101 A * 8/1988 Bauer et al. ................ 338/198
4,920,244 A * 4/1990 Gundlach ................... 200/321
5,089,729 A * 2/1992 Moores, Jr. ............. 200/1 V X
5,136,130 A * 8/1992 Daly ....................... 200/318.1
4,097,703 A 6/1998 Houser .................... 200/332.2
6,274,828 B1 * 8/2001 Chu .......................... 20/43.17

FOREIGN PATENT DOCUMENTS

DE 2410871 A1 * 9/1975
DE 334474 C2 6/1985
DE 3421670 A1 10/1985
EP 0157186 A3 * 10/1985

* cited by examiner

*Primary Examiner*—J. R. Scott
(74) *Attorney, Agent, or Firm*—Morgan, Lewis & Bockius LLP

(57) ABSTRACT

An electrical switch for the speed setting of an electric motor in an electrical appliance includes a movable actuator member and a blocking structure. The actuator member is movable from an initial position into a plurality of actuating positions. The blocking means can be switched over between a blocking state for blocking the movement of the actuating member and a release state for releasing the movement of the actuating member. A first blocking means acts on the actuating member in the initial position. A second blocking means acts on the actuating member in the first actuating position. An actuating element has three switching positions for switching over the two blocking means. The first blocking means is in the blocking state in the first switching position. The first blocking means is in the release state and the second blocking means is in the blocking state in the second switching position. Both blocking means are in the release state in the third switching position.

10 Claims, 9 Drawing Sheets

ELECTRIC SWITCH

BACKGROUND OF THE INVENTION

The invention relates to an electrical switch, for the speed setting of an electric motor in an electrical appliance, including a movable actuating member and blocking means. The movable actuating member being movable from an initial position into actuating positions, in particular into a first and a second actuating position, in each case a function of the switch can be initiated. The blocking means is assigned to the switch, which blocking means can be switched over between a blocking state for blocking the movement of the actuating member and a release state for releasing the movement of the actuating member.

FIELD OF THE INVENTION

Such electrical switches are used in particular in electrical appliances, such as in portable electric tools or the like. For example, the portable electric tool may be an electric drill. The switch serves to switch an electric motor of the portable electric tool on and off and if need bealso to set the speed of said electric motor. In order to avoid unintentional switching-on of the portable electric tool, the electrical switch may be provided with a switch release.

Electrical switches having a switch release have been disclosed, for example, by DE-A 24 10 871. This switch has a housing, an actuating member arranged so as to be movable on the housing, and a plunger transmitting the movement of the actuating member into the housing and intended for acting on the switch. The actuating member can be moved from an initial position into actuating positions, in which in each case a function of the switch can be initiated. Assigned to the switch is a blocking means, which can be switched over between a blocking state for blocking the movement of the actuating member and a release state for releasing the movement of the actuating member.

The blocking means in this switch acts as a switch release. Once the actuating means has been switched over in the initial position from the blocking state into the release state, the actuating member can be moved into the actuating position. In the actuating position, however, no further action of a blocking means is provided, so that the blocking means on this switch only has single functionality.

SUMMARY OF THE INVENTION

The object of the invention is to provide a switch of the type mentioned at the beginning with blocking means of extended functionality.

In the switch according to the invention, first blocking means act on the actuating member in its initial position, and second blocking means act on the actuating member in a first actuating position of the latter. An actuating element having three switching positions for switching over the two blocking means is assigned to the switch. The first blocking means is in the blocking state in the first switching position of the actuating element. The first blocking means is in the release state and the second blocking means is in the blocking state in the second switching position. Finally, both blocking means are in the release state in the third switching position. Further refinements of the invention are described below.

The first blocking means is preferably arranged in the vicinity of the actuating member and the second blocking means is preferably arranged in the vicinity of the plunger. In this case, a gate on the top side of the actuating member may serve to guide a part of the first blocking means. A part of the second blocking means may be arranged centrally at the plunger.

The first blocking means may be designed like a switch release for the actuating member, and the second blocking means may be designed like a connection release for the actuating member. The actuating element can expediently be switched over only in the initial position of the actuating member.

In a special refinement, the first blocking means consists of an extension, in operative connection with the actuating element, and a corresponding stop arranged on the actuating member. In this case, the extension comes to bear against the stop in the initial position in the blocking state and can be moved laterally past the stop in the release state. The second blocking means is designed as a stroke limit for the actuating member in such a way that the motion path of the actuating member in the blocking state is limited to the first actuating position and in the release state is cleared for further movement into the second actuating position.

The stroke limit may in turn consist of a movable lug ring concentrically surrounding the plunger and of a corresponding stop provided on the actuating member. In this case, the stop comes to bear against a lug of the lug ring in the first actuating position in the blocking state and can be moved laterally past the lug in the release state. A pin which is on the actuating element and engages in a fork attached to the lug ring may serve to move the lug ring between the blocking state and the release state.

In order to ensure ease of operation by the user, the actuating element may be designed as a slide, pivoted lever, adjusting wheel or the like having three catch positions. An extension on the actuating element interacts with a catch spring for securing the catch positions. The first switching position for the actuating element is preferably formed by the center catch position and the second and third switching positions are preferably formed by in each case a lateral catch position. Function symbols may be provided on the actuating element, in which case the function symbol can be seen by the user in the respective switching position, said function symbol characterizing this switching position.

Furthermore, it is simple to fit the switch in the electrical appliance if the actuating element forms a preassembled module with the switch. For this purpose, a support part, for example, may be connected to the housing of the switch, the actuating element being mounted so as to be movable in the support part.

The advantages achieved with the invention consist in particular in the fact that certain functions of the switch can be selected and further functions can be blocked in the initial position of the actuating member. This effectively prevents functions which are not desired from being switched on inadvertently by the user, whereby the risk of accident for the user is also reduced. For example, the portable electric tool can be operated with a variable and if need be controlled speed, which is less than the maximum speed, in a first actuating position of the actuating member, whereas it can be operated with the maximum speed in a second actuating position of the portable electric tool, where the maximum speed is not controlled by the electronics. The user can block the second actuating position in a preselectable manner according to of the material to be worked, which results in an optimum working result.

In addition, said functionality is combined with a switch release already used hitherto.

Only a single actuating element is advantageously used for both blocking means, so that operation is simplified on the one hand and costs are also saved on the other hand.

The switch according to the invention achieves a further safety advantage for the user of the portable electric tool. Due to the design of the blocking means, the occurrence of a tilting moment at the actuating member is avoided even if the actuating member is subjected to excessive stress when the blocking means is in the blocking state. This effectively prevents the portable electric tool from being switched on inadvertently or inappropriately.

DETAILED DESCRIPTION OF THE PREFERRED EMBODIMENTS

Figure 6:
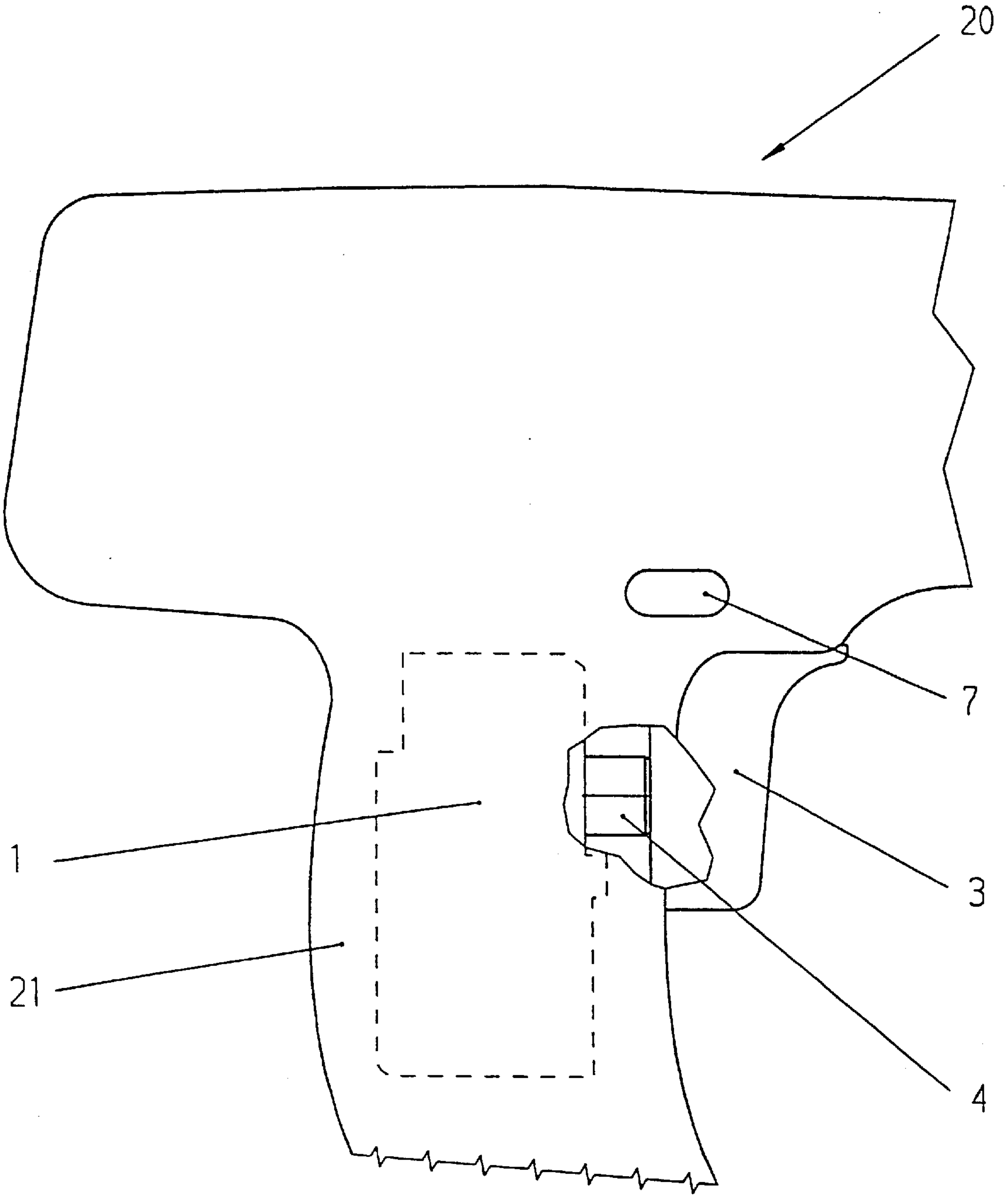
FIG. 6 shows the electrical switch arranged in an electric drill.

A portable electric tool 20 is shown in FIG. 6. The portable electric tool 20 has an electrical switch 1, which is arranged in the handle 21 and serves to switch the electric motor (not shown in any more detail) in the portable electric tool on and off and to set the speed of said electric motor. The portable electric tool 20 may be, for example, a mains-operated electric drill, a cordless drill or the like.

Figure 1:
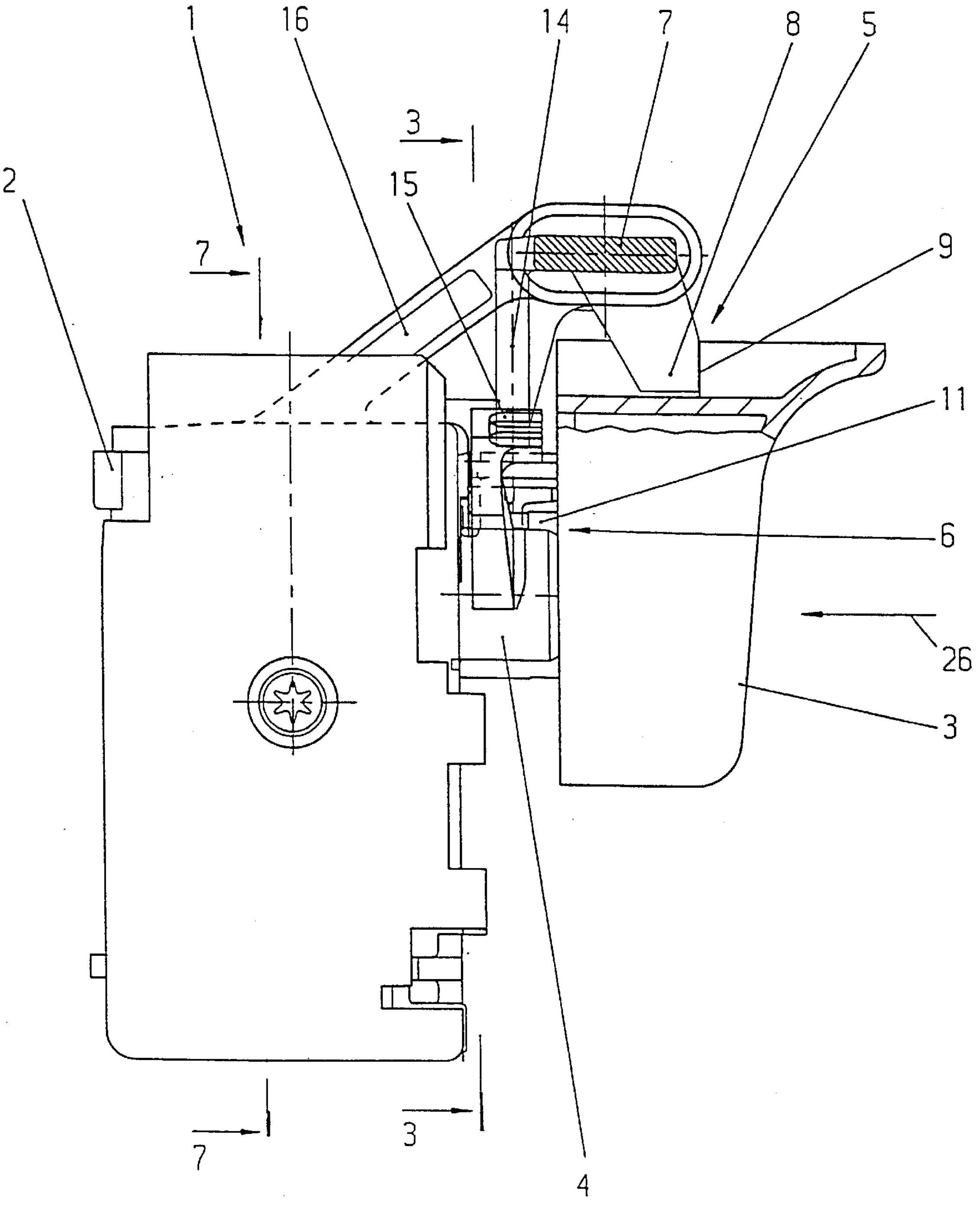
FIG. 1 shows an electrical switch in side view.

The switch 1, shown in more detail in FIG. 1, has a housing 2, on which an actuating member 3 is arranged so as to be movable. The actuating member 3 is, for example, in the form of a linearly movable pushbutton, which the user moves manually. In accordance with the respective actuating path of the actuating member 3, the speed of the electric motor is set and if need be controlled by means of a phase control, a pulse-width modulation or the like, i.e. is kept largely constant even under loading of the portable electric tool 20. When the actuating member 3 is fully switched through, the electric motor then runs at maximum speed.

Furthermore, the switch 1 has a plunger 4, which transmits the movement of the actuating member 3 into the housing 2. In the case of an actuating member 3 designed as a pushbutton, the plunger 4 may be fastened to the pushbutton approximately in the center or else slightly off-center, for example so as to face the underside of the pushbutton. In the housing 2, the plunger 4 acts on at least one electrical component located in the housing 2, such as a contact system 22, 23, a potentiometer 25 assigned to a printed circuit board 24, or the like, as can be seen in more detail with reference to FIG. 7. By manual action of the user, the actuating member 3 can be moved from an initial position, which is shown in FIG. 1, in direction 26 into a first actuating position and from the latter into a further second actuating position. In these two actuating positions, in each case a function of the switch 1 can be initiated by the action of the plunger 4, to be specific, in the first actuating position, activation of the electric motor for a speed corresponding to the actuating path covered by the actuating member 3 and, in the second actuating position, the setting of the maximum speed by the full voltage being applied to the electric motor.

Assigned to the switch 1 are two blocking means 5, 6, which can be switched over between a blocking state for blocking the movement of the actuating member 3 and a release state for releasing the movement of the actuating member 3. The first blocking means 5 is located in the vicinity of the actuating member 3 and acts on the actuating member 3 in its initial position. The second blocking means 6 is located in the vicinity of the plunger 4 and acts on the actuating member 3 in the first actuating position. The second blocking means 6 is preferably arranged centrally at the plunger 4. Furthermore, it is essential that a single actuating element 7 having three switching positions for switching over the two blocking means 5, 6 is assigned to the switch 1. The first blocking means 5 is in the blocking state, in the first switching position of the actuating element 7. The first blocking means 5 is in the release state and the second blocking means 6 is in the blocking state, in the second switching position of the actuating element 7. Finally, both blocking means 5, 6 are in the release state in the third switching position of the actuating element 7.

Figure 7:
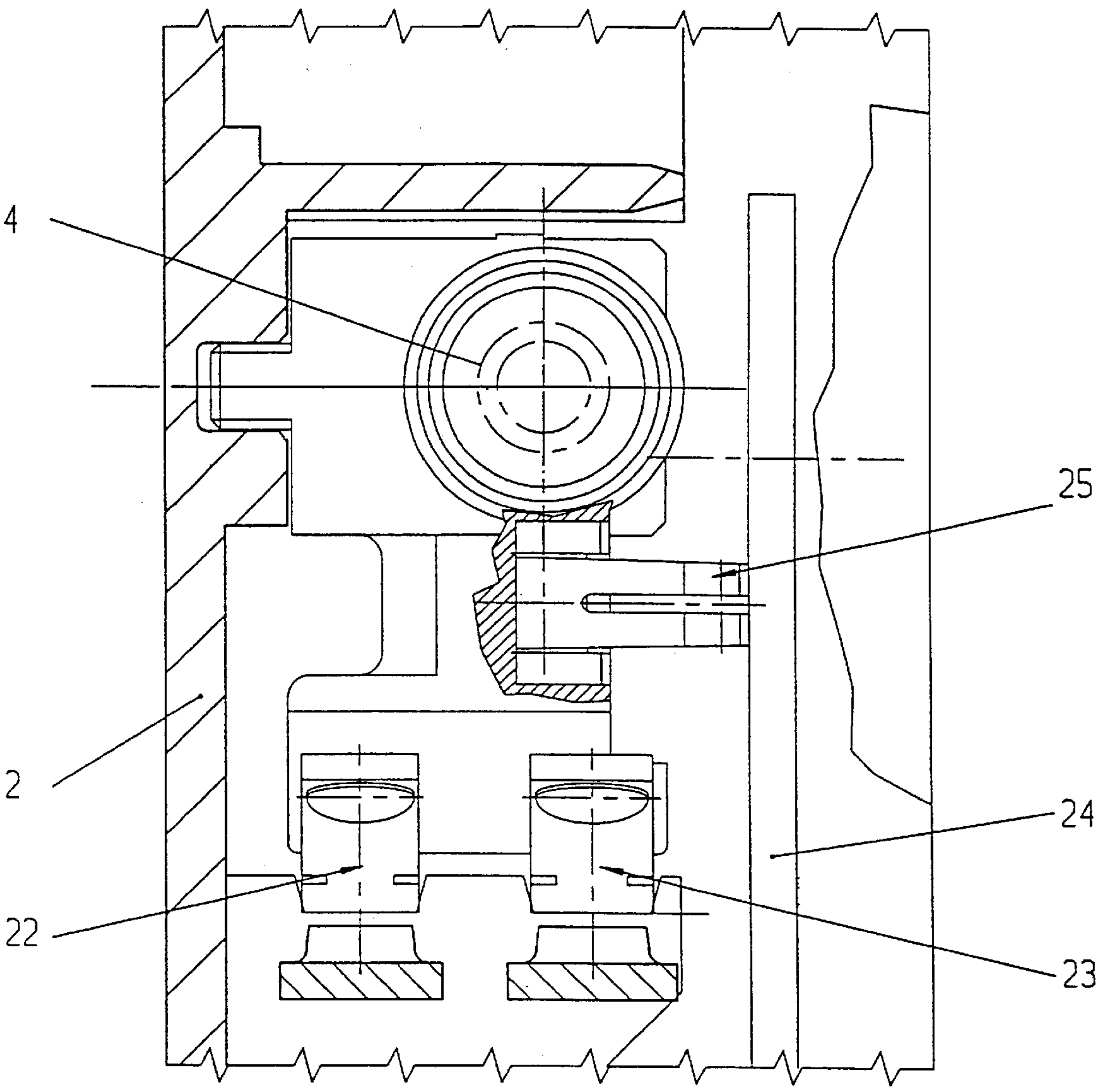
FIG. 7 shows a section through the switch along line 7—7 from FIG. 1.

Two contact systems 22, 23 are preferably located in the housing 2 of the switch 1, as can be seen in more detail from FIG. 7. If need be, a potentiometer 25 and electronics for the speed setting or the speed control of the electric motor may also be arranged on the printed circuit board 24 in the housing 2. In the initial position of the actuating member 3, then, the plunger 4 does not act on the two contact systems 22, 23, whereby the electric motor is switched off. The first blocking means 5 is designed like a switch release for the actuating member 3, so that the actuating member 3 cannot be moved in the first switching position of the actuating element 7, whereby the electric motor is prevented from being switched on. Not until after the actuating element 7 has been switched over into the second or third switching position can the electric motor be switched on.

If the actuating element 7 is located in the second switching position, the actuating member 3 can be moved into the first actuating position. In the first actuating position, the plunger 4 has a switching effect on the first contact system 22, whereby the voltage for the electronics is switched on. If need be, there is also an effect on the potentiometer 25 in accordance with the motion path of the actuating member 3 in direction 26 (see FIG. 1), so that a variable and preferably controlled speed of the electric motor is set via the electronics in accordance with the motion position of the actuating member 3. The second blocking means 6 is designed like a connection release for the actuating member 3, whereby further switching of the actuating member 3 into the second actuating position is prevented, since the second blocking means 6 is in the blocking state.

Finally, if the actuating element 7 is in the third switching position, the actuating member 3 can be moved into both the first and the second actuating positions, since both blocking means 5, 6 are in the release state. In the second actuating position, the plunger 4 then has a switching effect on the second contact system 23, as a result of which the electronics are bridged. The full voltage is therefore applied to the electric motor and the electric motor moves at maximum, uncontrolled speed.

The actuating element 7 can expediently be switched over only in the initial position of the actuating member 3. In the initial position, a switch release for the electric motor is present first of all in the first switching position, and this switch release serves to protect the user from unintentional operation of the portable electric tool 20. For operation, the user must deliberately switch over the actuating element 7. In this case, the user can choose between the second and third switching positions. In the second switching position, the electric motor can be operated with an adjustable and controlled speed, which, however, is lower than the maximum speed. This mode of operation is suitable for working hard materials, for example for drilling in metal. In the third switching position, the electric motor can be operated with an adjustable speed up to the maximum speed, although the operation at maximum speed is not controlled by the electronics. This mode of operation may be expedient for working soft materials, for example when drilling in wood.

A preferred more detailed configuration of the two blocking means 5, 6 is to be described in more detail below.

As can be seen with reference to FIG. 1, the first blocking means 5 consists of an extension 8, in operative connection with the actuating element 7, and a corresponding stop 9 arranged on the actuating member 3. The extension 8 may be formed in one piece with the actuating element 7. In the initial position of the actuating member 3, the extension 8, in the blocking state, that is when the actuating element 7 is located in the first switching position, comes to bear against the stop 9, as can be seen in more detail from FIGS. 2 and 4. The release state corresponding to the second switching position of the actuating element 7 can be seen in FIG. 3, and the release state corresponding to the third switching position of the actuating element 7 can be seen in FIG. 5. As can be seen with reference to FIG. 2 in combination with FIG. 3 or 5, the extension 8 and the stop 9 can be moved laterally past one another in the release state. For this purpose, there is a gate 10 in the actuating member 3. In particular in the case of an actuating member 3 designed as a pushbutton, it is appropriate to arrange the gate 10 on the top side of the actuating member 3 for guiding a part of the first blocking means, specifically the extension 8.

The second blocking means 6 is designed as a stroke limit for the actuating member 3. As a result, the motion path of the actuating member 3 in the blocking state, that is when the actuating element 7 is located in the second switching position, is limited to the first actuating position. The stroke limit consists of a lug element 11, arranged so as to be movable on the housing 2 and having at least one lug 12, and at least one corresponding stop 13 provided on the actuating member 3, as can be seen in more detail from FIG. 2. In the first actuating position of the actuating member 3, the stop 13, in the blocking state, comes to bear against the lug 12, as can be seen in FIG. 3, whereby the motion path or the stroke of the actuating member 3 is limited to the first actuating position. In the release state for the second blocking means 6 in accordance with the third switching position, shown in FIG. 5, of the actuating element 7, the stop 13 can be moved laterally past the lug 12, so that the actuating member 3 can be moved right into the second actuating position.

Figure 2:
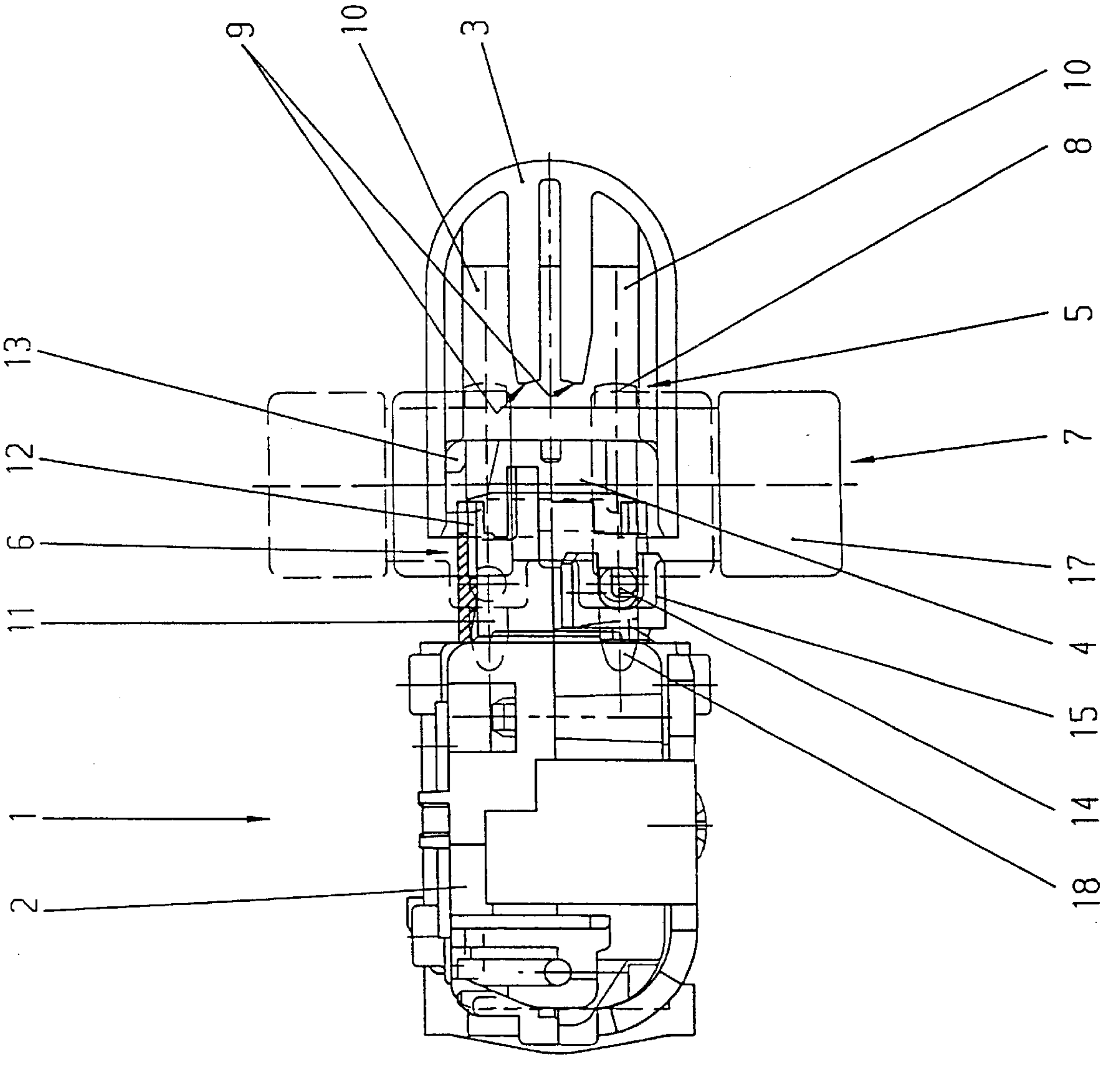
FIG. 2 shows the electrical switch from FIG. 1 in plan view.
Figure 3:
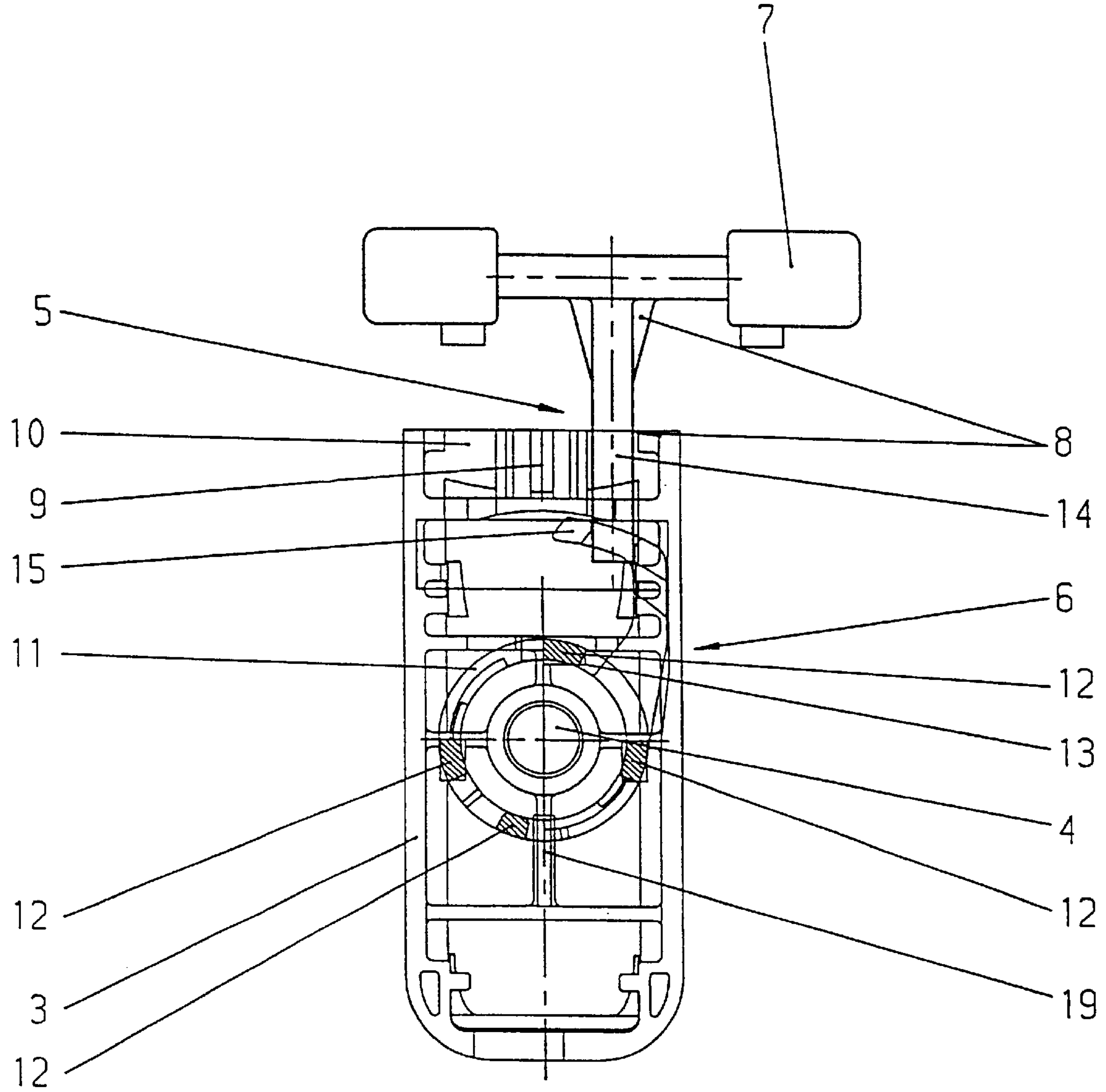
FIG. 3 shows a section along line 3—3 from FIG. 1, the actuating element for the blocking means being located in the second switching position.
Figure 4:
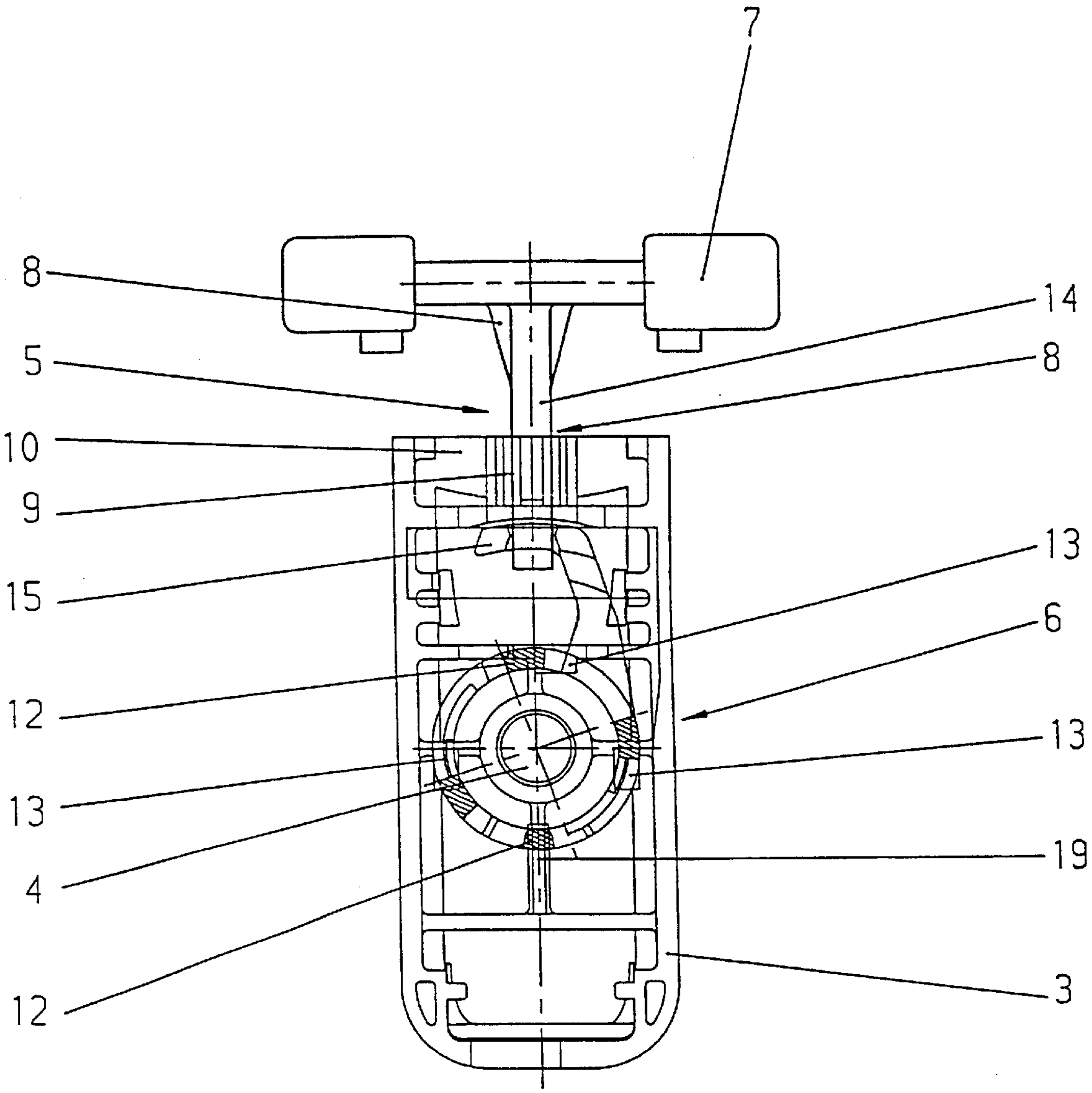
FIG. 4 shows a section as in FIG. 3, the actuating element for the blocking means being located in the first switching position.
Figure 5:
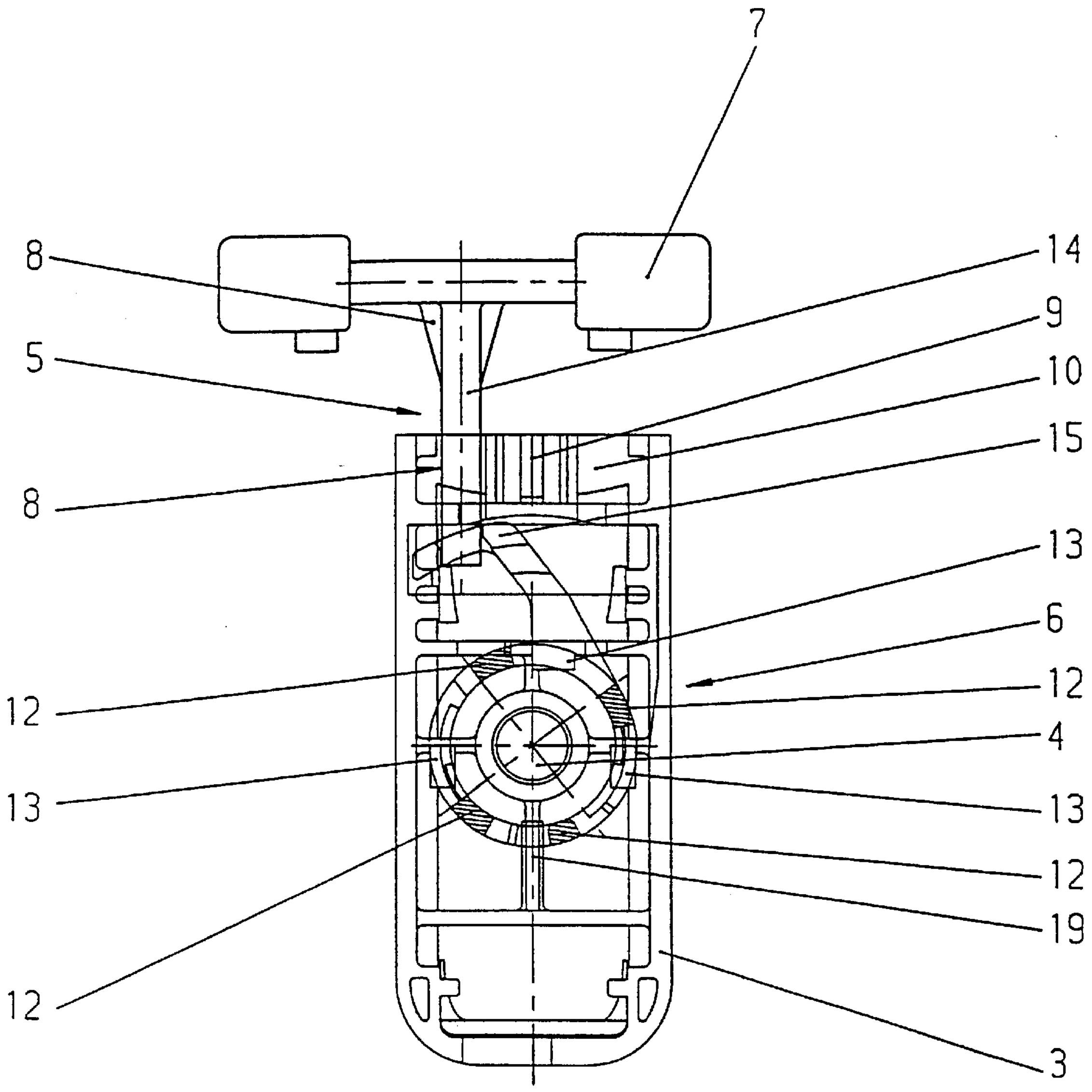
FIG. 5 shows a section as in FIG. 3, the actuating element for the blocking means being located in the third switching position.

As can also be seen from FIGS. 1 and 2, a pin 14, which engages in a fork 15 attached to the lug element 11, is arranged on the actuating element 7. When the actuating element 7 is switched over between the second and third switching positions, the lug element 11 can be moved by means of the pin 14 between the blocking state and the release state, as can be seen in more detail from FIGS. 3 and 5. The second switching position of the actuating element 7 is shown in FIG. 3, in which switching position the lug 12 is located in such a position that the second blocking means 6 is in the blocking state. An intermediate position of the lug 12 is shown in FIG. 4, this intermediate position corresponding to the first switching position of the actuating element 7. In the first switching position, however, as explained further above, the first blocking means 5 is in the blocking state, so that the second blocking means 6 does not come further into effect here. Finally, the third switching position of the actuating element 7 is shown in FIG. 5, in which switching position the lug 12 is located in such a position that the second blocking means 6 is in the release state.

The configuration of the second blocking means 6 as a stroke limit arranged in the vicinity of the plunger 4 prevents a tilting moment from occurring at the actuating member 3 if the user exerts an inappropriate or forceful effect on the actuating member 3. In particular if the actuating element 7 is located in the second switching position according to FIG. 3, whereby the second blocking means 6 assumes its blocking state, tilting of the actuating member 3 is ruled out, since the actuating member 3 bears firmly against the lug 12, which is located at the bottom part of the housing 2. This effectively prevents the blocking state from being overcome and effectively prevents unintentional further switching of the actuating member 3 into the second actuating position. This mode of operation can be improved by the lug element 11 being designed as a lug ring concentrically surrounding the plunger 4, a feature which can be seen in particular with reference to FIGS. 3 to 5. In addition, tilting of the actuating member 3 is also effectively prevented in the first switching position of the actuating element 7 according to FIG. 4, by the lug 12 there additionally bearing against a web 19 which is integrally formed in the actuating member 3.

As shown in FIG. 1, the actuating element 7 may be mounted so as to be movable in a support part 16 connected to the housing 2. Of course, the actuating element 7 may also be mounted merely in the handle 21 of the portable electric tool 20 as a part to be fitted separately.

The actuating element 7 is designed as a slide having three catch positions. As can be seen in more detail in particular from FIG. 2, where the second switching position of the actuating element 7 is depicted by continuous lines and the further switching positions of the actuating element 7 are depicted by broken lines, the first switching position for the actuating element 7 is formed by the center catch position, and the second and third switching positions are formed by the two lateral catch positions. A catch spring (not shown in any more detail here) interacts with an extension 18, which can be seen in FIG. 2, on the actuating element 7 for securing the catch positions.

Figure 8:
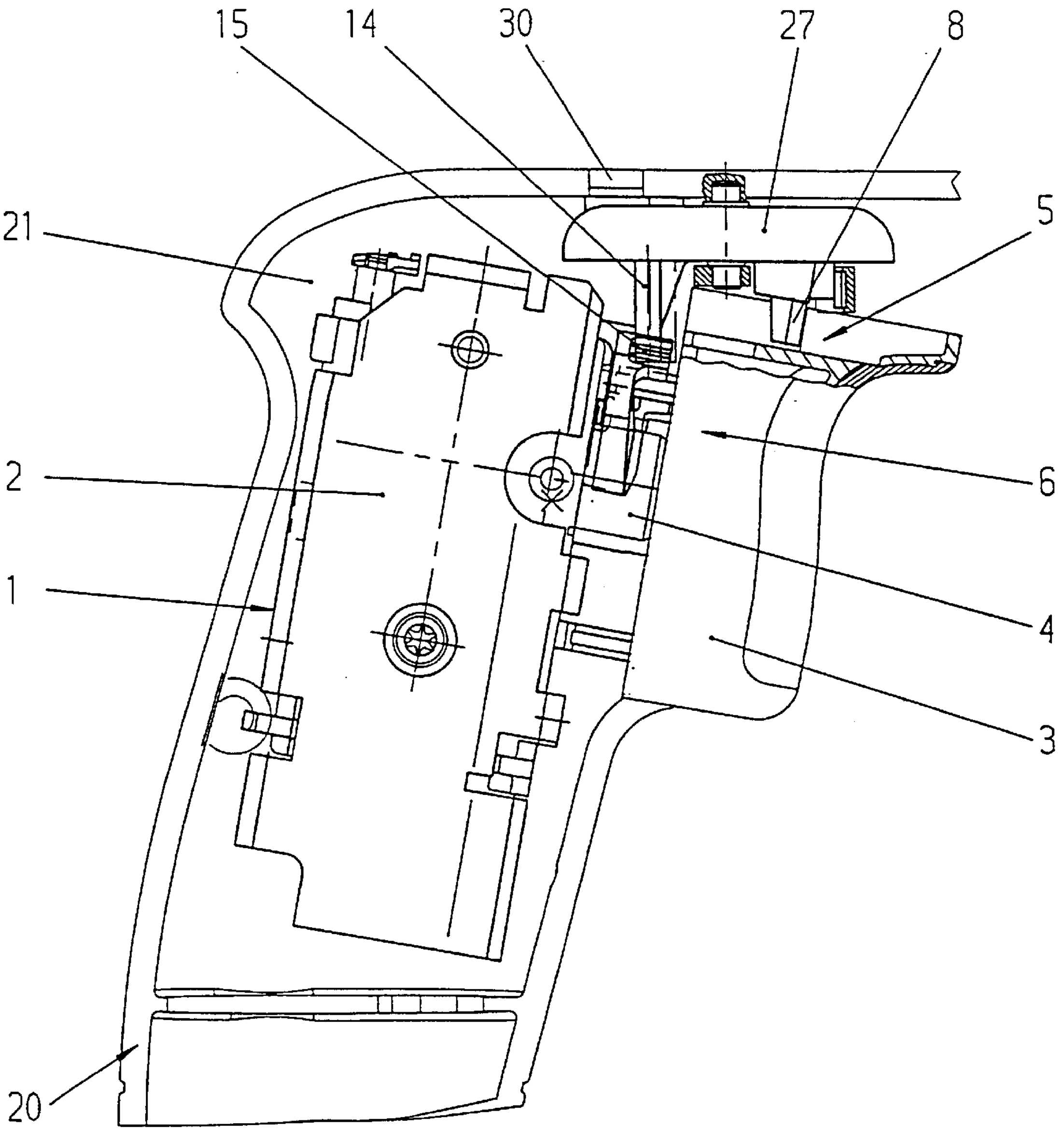
FIG. 8 shows an electrical switch in side view in a further exemplary embodiment.
Figure 9:
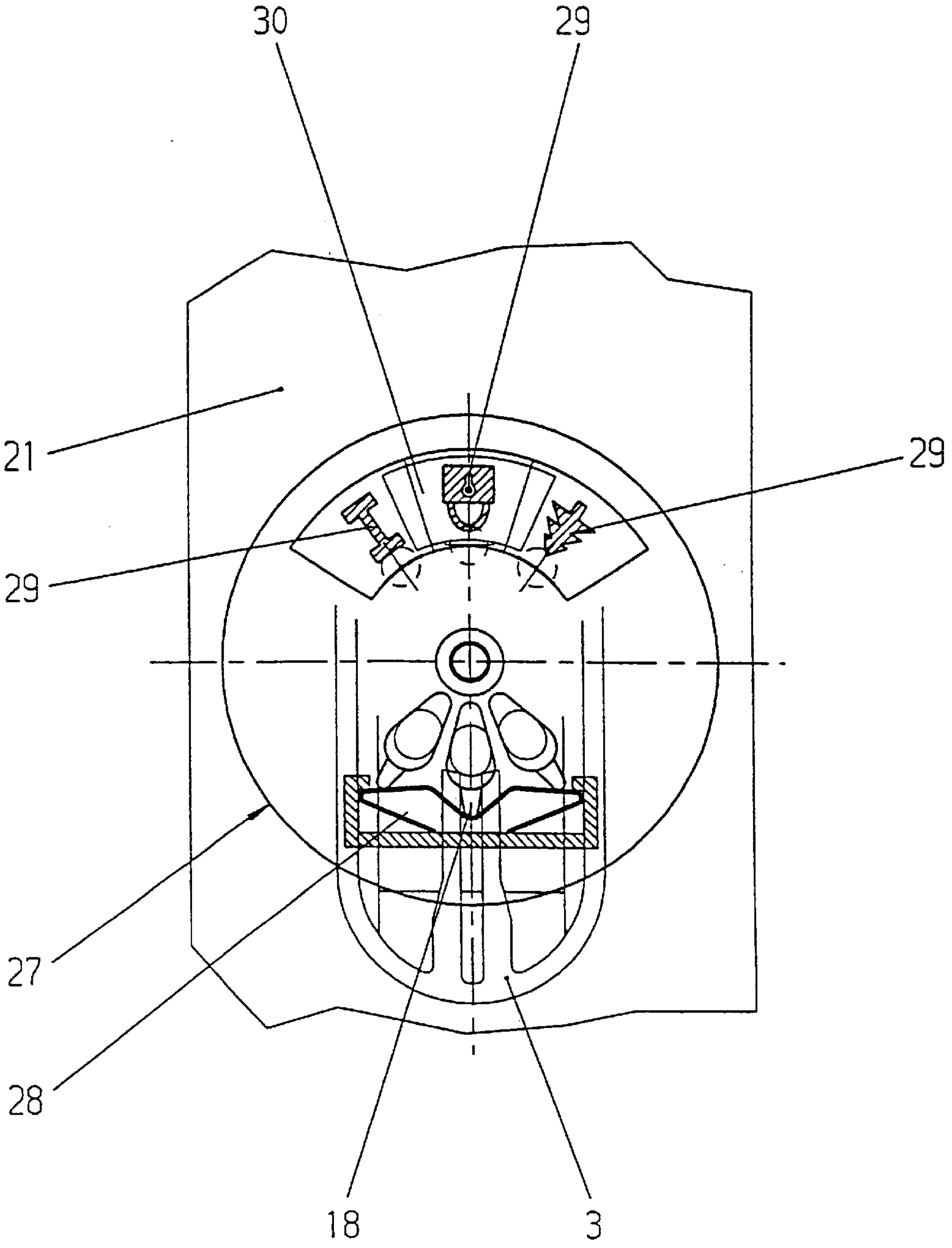
FIG. 9 shows a plan view of the actuating element according to FIG. 8.

Of course, the actuating element 7 may also be designed as a pivoted lever or the like. An adjusting wheel 27 as the actuating element for switching over the two blocking means 5, 6 is shown as a further exemplary embodiment in FIGS. 8 and 9. The adjusting wheel 27 is rotatably mounted in the handle 21 of the portable electric tool 20. The adjusting wheel 27 has three catch positions, which are secured by the interaction of a spring 28, which can be seen in FIG. 9, with an extension 18 of the adjusting wheel 27. These catch positions are in turn the three switching positions of the adjusting wheel 27. Provided on the adjusting wheel 27 are function symbols 29 which characterize the respective switching position. There is a window 30 in the handle 21, so that the function symbol 30 assigned to the respectively assumed switching position can be seen by the user.

The invention is not restricted to the preferred embodiment shown and described. On the contrary, it also comprises all developments by the person skilled in the art within the scope of the idea behind the invention. For instance an electrical switch which is provided with two blocking means interacting in accordance with the invention may be used not only in portable electric tools but also advantageously in household appliances, garden implements or other electrical appliances.

What is claimed is:

1. An electrical switch, for the speed setting of an electric motor in an electrical appliance, comprising:

a movable actuating member, the actuating member being movable from an initial position into a first actuating position and a second actuating position, in each case a function of the switch can be initiated; and blocking means being assigned to the switch, which blocking means can be switched over between a blocking state for blocking the movement of the actuating member and a release state for releasing the movement of the actuating member, wherein a first blocking means acts on the actuating member in the initial position, a second blocking means acts on the actuating member in the first actuating position, and an actuating element has three switching positions for switching over the two blocking means, and wherein the first blocking means is in the blocking state in the first switching position, the first blocking means is in the release state and the second blocking means is in the blocking state in the second switching position, and both blocking means are in the release state in the third switching position.

2. The electrical switch according to claim 1, wherein the movement of the actuating member can be transmitted by a plunger acting on the switch, in particular initiating the functions of the switch in the actuating positions, wherein the first blocking means is in the vicinity of the actuating member and wherein the second blocking means is in the vicinity of the plunger.

3. The electrical switch of claim 2, wherein the first blocking means is designed as a switch release for the actuating member, and the second blocking means is designed as a connection release for the actuating member, wherein a gate for guiding a part of the first blocking means is located on the top side of the actuating member, and the plunger is aligned relative to the actuating member approximately in such a way as to face an underside of the actuating member, a part of the second blocking means being arranged centrally at the plunger.

4. The electrical switch of claim 3, wherein the actuating member, which is designed as a linearly movable pushbutton, is arranged so as to be movable on a housing of the switch, wherein the plunger transmits the movement of the actuating member into the housing, and the plunger acts on at least one electrical component located in the housing.

5. The electrical switch according to claim 4, wherein two contact systems and electronics for the speed setting, in particular the speed control of the electric motor, are located in the housing, wherein the plunger has no effect on the two contact systems in the initial position of the actuating member, the plunger has a switching effect on the first contact system in the first actuating position, in particular for switching on the voltage for the electronics, and the plunger has a switching effect on the second contact system in the second actuating position to bridge the electronics to provide a maximum speed of the electric motor that is not controlled by the electronics.

6. The electrical switch of claim 5, wherein the actuating element can be switched over only in the initial position of the actuating member, wherein the first blocking means consists of an extension in operative connection with the actuating element and in particular formed in one piece with the actuating element, and of a corresponding stop arranged on the actuating member, in such a way that the extension comes to bear against the stop in the initial position in the blocking state and can be moved laterally past the stop, in particular in a gate in the actuating member in the release state, and wherein the second blocking means is configured as a stroke limit for the actuating member such that the motion path of the actuating member in the blocking state is limited to the first actuating position and in the release state is cleared for further movement into the second actuating position.

7. The electrical switch of claim 6, wherein the stroke limit consists of a lug element arranged so as to be movable on the housing and having at least one lug, in particular a lug ring concentrically surrounding the plunger, and at least one corresponding stop provided on the actuating member such that the stop comes to bear against the lug in the first actuating position in the blocking state and can be moved laterally past the lug in the release state, the lug element being movable between the blocking state and the release state by means of a pin which is arranged on the actuating element and engages in particular in a fork attached to the lug element.

8. The electrical switch of claim 7, wherein the actuating element is designed as a slide, pivoted lever, or adjusting wheel having three catch positions, a catch spring interacting with an extension on the actuating element for securing the catch positions, the first switching position for the actuating element is formed by the center catch position and the second and third switching positions each are formed by one of the two lateral catch positions, and a function symbol which can be seen in the respective switching position and characterizes this switching position is provided on the actuating element.

9. The electrical switch of claim 8, wherein the actuating element is mounted so as to be movable in a support part connected to the housing.

10. The electrical switch of claim 5, further comprising a potentiometer for controlling the speed of the electric motor in the housing, wherein the plunger has no effect on the two contact systems in the initial position of the actuating member, the plunger has a switching effect on the first contact system in the first actuating position, in particular for switching on the potentiometer for setting a variable and controlled speed of the electric motor in accordance with the motion position of the actuating member.

* * * * *